United States Patent
Tyan et al.

(10) Patent No.: US 10,288,265 B1
(45) Date of Patent: May 14, 2019

(54) OPTICAL ASSEMBLY AND THE METHOD TO MAKE THE SAME

(71) Applicant: UBRIGHT OPTRONICS CORPORATION, Taoyuan (TW)

(72) Inventors: Yi-Long Tyan, Taoyuan (TW); Lung-Pin Hsin, Taoyuan (TW); Ching-An Yang, Taoyuan (TW); Yu-Mei Juan, Taoyuan (TW); Chien-Chih Lai, Taoyuan (TW)

(73) Assignee: UBRIGHT OPTRONICS CORPORATION, Taoyuan (TW)

( * ) Notice: Subject to any disclaimer, the term of this patent is extended or adjusted under 35 U.S.C. 154(b) by 0 days.

(21) Appl. No.: 15/834,060

(22) Filed: Dec. 7, 2017

Related U.S. Application Data

(60) Provisional application No. 62/581,054, filed on Nov. 3, 2017.

(51) Int. Cl.
   *F21V 3/04*    (2018.01)
   *F21V 17/10*   (2006.01)
   *F21V 8/00*    (2006.01)

(52) U.S. Cl.
   CPC ............ *F21V 17/101* (2013.01); *F21V 3/049* (2013.01); *G02B 6/0051* (2013.01); *G02B 6/0053* (2013.01)

(58) Field of Classification Search
   CPC ...... F21V 17/101; F21V 3/049; G02B 6/0051; G02B 6/0053
   See application file for complete search history.

(56) References Cited

U.S. PATENT DOCUMENTS

| | | | |
|---|---|---|---|
| 8,821,002 B2 * | 9/2014 | Chang | G02B 6/0061 362/623 |
| 2012/0147627 A1 * | 6/2012 | Pan | G02B 6/0051 362/624 |
| 2013/0004728 A1 * | 1/2013 | Boyd | G02B 5/045 428/172 |
| 2017/0031083 A1 * | 2/2017 | Lai | G02B 6/0036 |
| 2017/0199309 A1 * | 7/2017 | Yuan | G02B 5/0221 |

\* cited by examiner

*Primary Examiner* — Seung H Lee
(74) *Attorney, Agent, or Firm* — Litron Patent and Trademark Office; Min-Lee Teng

(57) ABSTRACT

The present invention discloses an optical assembly used in the backlight module. The optical assembly comprises: a first optical film having a first surface; an adhesive layer having a second surface and a third surface opposite to the second surface, wherein the second surface of the adhesive layer is disposed on the first surface of the first optical film; and a diffusing sheet having a fourth surface comprising a plurality of first microstructures and a plurality of second microstructures, wherein each of the plurality of second microstructures extends along a first direction, wherein the maximum height of the plurality of second microstructures is greater than that of the plurality of first microstructures so as to bond the plurality of second microstructures to the third surface of the adhesive layer.

24 Claims, 7 Drawing Sheets

OPTICAL ASSEMBLY AND THE METHOD TO MAKE THE SAME

CROSS-REFERENCE TO RELATED APPLICATION

This application claims the benefit of U.S. provisional patent application No. 62/581,054, filed on Nov. 3, 2017, which is hereby incorporated herein by reference.

BACKGROUND OF THE INVENTION

1. Field of the Invention

The present invention relates to an optical assembly, and more particularly to an optical assembly combined by an adhesive.

2. Description of Related Art

The flat display panel, such as liquid crystal display (LCD), is widely used. The liquid crystal display (LCD) may require a backlight module which serves as a surface light source to provide light uniformly to the entire screen. The current backlight module comprises a light guide plate, a light source disposed near the lateral surface of the light guide plate and inside of a light source reflective mask, a reflection sheet disposed over the bottom surface of the light guide plate and a combination of the diffusing sheet(s), the prism sheet(s) and other optical films disposed over the top surface of the light guide plate.

Adhering the diffusing sheet to the prism sheet is one way to reduce the total thickness of the optical films of the backlight module. Only the irregular elevating portions of the structured surface of the diffusing sheet are respectively point-bonded to the adhesive layer on the backside of the substrate of the prism sheet. This adhesive method results in some undesired phenomena, such as poor light uniformity, poor flaw-masking, poor adhesive force and poor adhesive uniformity. Accordingly, the present invention proposes an optical assembly and its manufacturing method to overcome the above-mentioned disadvantages.

SUMMARY OF THE INVENTION

The optical assembly of the present invention can solve the problems including poor light uniformity, poor flaw-masking, poor adhesive force, poor adhesive uniformity, and so on in the adhesive process. Moreover, because there is a periodic design in the extending bonding microstructures on the structured surface of the diffusing sheet, Moiré pattern can be effectively solved. The optical assembly of the present invention can also solve the problems including curl, waving, protrusion, depression, and so on which occur in a single optical film suffering from poor heat uniformity. The optical assembly can largely reduce the total thickness of the optical films in the backlight module and improve heat-resistance to prevent deformation at the same time.

In one embodiment, the present invention discloses an optical assembly used in the backlight module. The optical assembly comprises: a first optical film having a first surface; an adhesive layer having a second surface and a third surface opposite to the second surface, wherein the second surface of the adhesive layer is disposed on the first surface of the first optical film; and a diffusing sheet having a fourth surface comprising a plurality of first microstructures and a plurality of second microstructures, wherein each of the plurality of second microstructures extends along a first direction, wherein the maximum height of the plurality of second microstructures is greater than that of the plurality of first microstructures so as to bond the plurality of second microstructures to the third surface of the adhesive layer.

In one embodiment, each two adjacent second microstructures has a space therebetween.

In one embodiment, the average height of the plurality of second microstructures is greater than that of the plurality of first microstructures on the spaces by 3~50 μm.

In one embodiment, the present invention discloses an optical assembly used in the backlight module. The optical assembly comprises: a prism sheet having a first surface; an adhesive layer having a second surface and a third surface opposite to the second surface, wherein the second surface of the adhesive layer is disposed on the first surface of the prism sheet; and a diffusing sheet having a fourth surface comprising a plurality of bonding microstructures, wherein each of the plurality of bonding microstructures extends along a first direction, wherein the plurality of bonding microstructures of the diffusing sheet are bonded to the third surface of the adhesive layer.

In one embodiment, each two adjacent bonding microstructures has a space therebetween.

In one embodiment, the average height of the bonding microstructures is greater than the average height of the diffusing microstructures on the spaces by 3~50 μm.

The detailed technology and above preferred embodiments implemented for the present invention are described in the following paragraphs accompanying the appended drawings for people skilled in the art to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE ILLUSTRATED EMBODIMENTS

The detailed explanation of the present invention is described as follows. The described preferred embodiments are presented for purposes of illustrations and description and they are not intended to limit the scope of the present invention.

Figure 1:
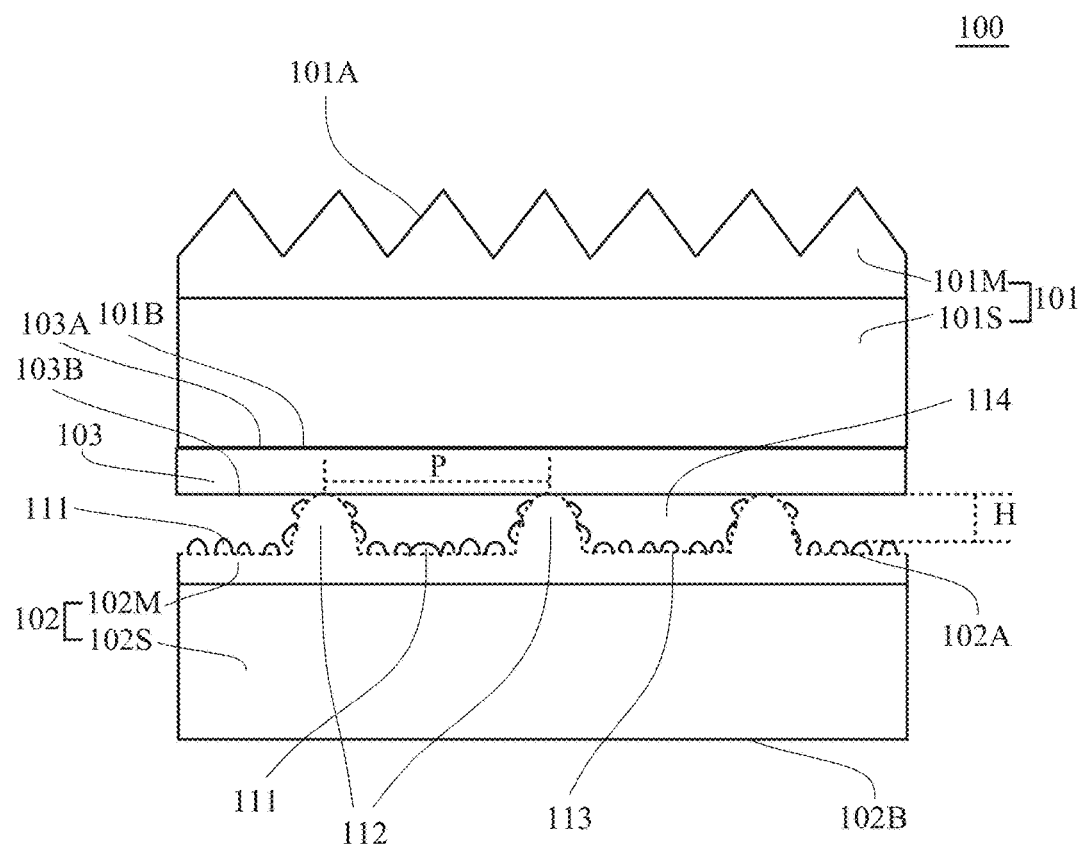
FIG. 1 illustrates a schematic cross-sectional view of the optical assembly used in the backlight module in the present invention.
Figure 2A:
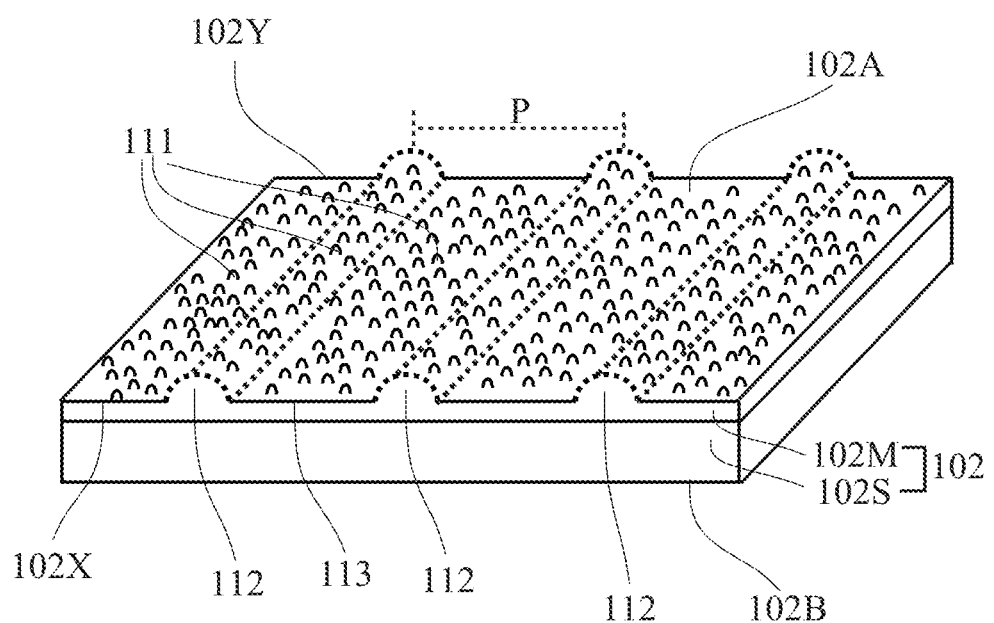
FIG. 2A illustrates a three-dimensional schematic view of the diffusing sheet of the optical assembly in the present invention.
Figure 2B:
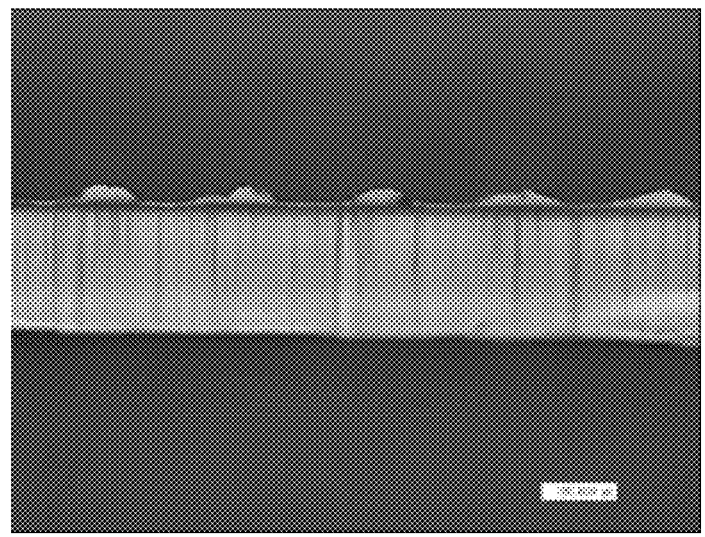
FIG. 2B illustrates a real cross-sectional view of the diffusing sheet of the optical assembly in the present invention.
Figure 2C:
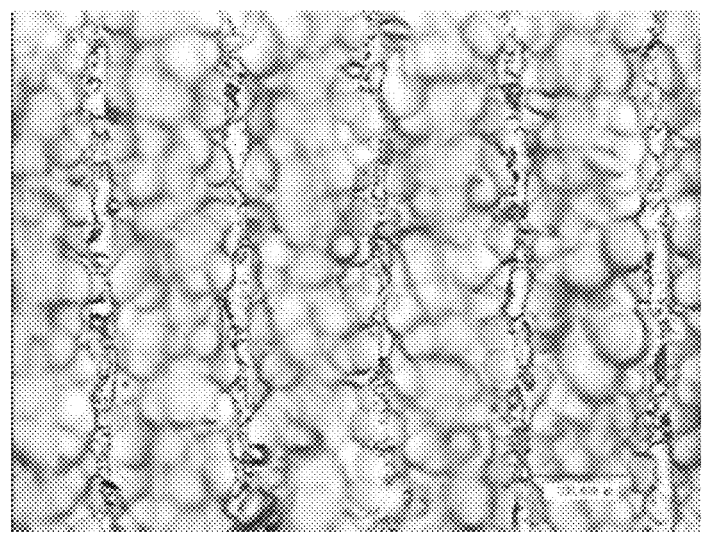
FIG. 2C illustrates a real top view of the diffusing sheet of the optical assembly in the present invention.

FIG. 1 illustrates a schematic cross-sectional view of the optical assembly 100 used in the backlight module in the present invention. FIG. 2A illustrates a three-dimensional schematic view of the diffusing sheet 102 of the optical assembly 100 in the present invention. FIG. 2B illustrates a real cross-sectional view of the diffusing sheet 102 of the optical assembly 100 in the present invention. FIG. 2C illustrates a real top view of the diffusing sheet 102 of the optical assembly 100 in the present invention. The optical assembly 100 comprises a first optical film 101, a diffusing sheet 102 and an adhesive layer 103 between the first optical film 101 and the diffusing sheet 102. The first optical film 101 has a first surface 101A and a second surface 101B opposite to the first surface 101A. The first optical film 101 can be any suitable optical film, such as light enhancement film, prism sheet, DBEF, and so on. Optionally, the first optical film 101 can comprise a substrate 101S (e.g., PET substrate) and the structured layer 101M (e.g., prism) disposed on the substrate 101S. The adhesive layer 103 has a first surface 103A and a second surface 103B opposite to the first surface 103A. The first surface 103A of the adhesive layer 103 is disposed on the second surface 101B of the first optical film 101. The diffusing sheet 102 has a first surface 102A and a second surface 102B opposite to the first surface 102A. The first surface 102A of the diffusing sheet 102 is a structured surface comprising a plurality of first microstructures 111 and a plurality of second microstructures 112. Optionally, the diffusing sheet 102 can comprise a substrate 102S and the light diffusing layer 102M disposed on the substrate 102S, and the light diffusing layer 102M comprises the first microstructures 111 and the second microstructures 112. Another light diffusing layer can be disposed on the second surface 102B of the diffusing sheet 102, but it is omitted herein. The single second microstructure 112 can have a linear length, a meandering length or a wave length and extend along a length direction thereof substantially perpendicular to the width direction (e.g., the cross-section direction) thereof. For example, each second microstructure 112 is parallel to the adjacent second microstructure 112 thereof. The length direction of the single second microstructure 112 of the diffusing sheet 102 can be substantially parallel to the length direction of the single prism of the prism sheet 101. The length direction of the single second microstructure 112 of the diffusing sheet 102 can be substantially perpendicular to (or not parallel to) the length direction of the single prism of the prism sheet 101 for overcoming the Moiré pattern. Each second microstructure 112 can extend from the first edge 102X of the first surface 102A to the second edge 102Y of the first surface 102A opposite to the first edge 102X of the first surface 102A. The maximum height (or the average height) of the second microstructures 112 is greater than that of the first microstructures 111 so as to bond the second microstructures 112 to the second surface 103B of the adhesive layer 103. The top of the second microstructure 112 may/may not penetrate into the adhesive layer 103.

In one embodiment, the first surface 101A of the first optical film 101 (e.g., prism sheet) is used for outputting light and the second surface 102B of the diffusing sheet 102 is used for inputting light. For example, in the backlight module, light exits the light guide plate and then enters the second surface 102B of the diffusing sheet 102; the diffusing sheet 102 is used for diffusing light entering the second surface 102B of the diffusing sheet 102 and the prisms of the prism sheet 101 is used for collimating light exiting the prismatic surface 101A of the prism sheet 101. In another embodiment, the first surface 101A of the first optical film 101 (e.g., prism sheet) is used for inputting light and the second surface 102B of the diffusing sheet 102 is used for outputting light. For example, in the backlight module, light exits the light guide plate and then enters the prismatic surface 101A of the prism sheet 101; the diffusing sheet 102 is used for diffusing light exiting the second surface 102B of the diffusing sheet 102. The latter means the adhesive optical assembly 100 in the present invention is applied to the technology of the inverse prism sheet.

The second microstructures 112 of the first surface 102A of the diffusing sheet 102 are bonded to the second surface 103B of the adhesive layer 103. Each two adjacent second microstructures 112 have a space 113 therebetween. The second microstructure 112 can be (or similar to) a lenticular structure or a cylinder structure. However, the present invention is not limited to this case; as long as each second microstructure 112 extends along a direction, the second microstructure 112 can have any suitable shape. Each second microstructure 112 is higher than the spaces 113 on both two sides thereof. The first microstructures 111 of the diffusing sheet 102 are mainly used for diffusing light. The average size of the first microstructures 111 is smaller than the average size of the second microstructures 112. Each first microstructure 111 doesn't extend from the first edge 102X of the first surface 102A to the second edge 102Y of the first surface 102A opposite to the first edge 102X of the first surface 102A. The first microstructures 111 of the first surface 102A of the diffusing sheet 102 can be distributed on at least one of the second microstructures 112 and spaces 113. The top of the second microstructure 112 is higher than the top of the first microstructure 111 on the space 113 by the height difference H such that the second microstructures 112 can be used to be bonded to the second surface 103B of the adhesive layer 103 and the first microstructures 111 on the spaces 113 are not bonded to the second surface 103B of the adhesive layer 103. Specifically, some first microstructures 111 on the second microstructures 112 can be also bonded to the second surface 103B of the adhesive layer 103. The second microstructures 112 of the first surface 102A of the diffusing sheet 102 are bonded to the second surface 103B of the adhesive layer 103 so as to increase the rigidity of the whole optical assembly 100. The first microstructures 111 on the spaces 113 are not bonded to the second surface 103B of the adhesive layer 103 and thus there exists air gaps 114 between the spaces 113 of the first surface 102A of the diffusing sheet 102 and the adhesive layer 103 to improve light diffusion. Conventionally, only the irregular elevating portions of the structured surface of the diffusing sheet are respectively point-bonded to the adhesive layer on the backside of the optical film. In the present invention, because each second microstructure 112 of the first surface 102A of the diffusing sheet 102 extends along a direction (continuously extending along a straight direction or a curved direction, extending along a straight direction is preferable), the adhesive region between the first optical film 101 and the diffusing sheet 102 can be improved to be bonded one-dimensionally or two-dimensionally; therefore, the adhesive force between the first optical film 101 and the diffusing sheet 102 can be improved to be at least 50 g/25 mm, preferably at least 100 g/25 mm. The height difference H of the second microstructure 112 and the first microstructure 111 on the space 113 can be 3~50 µm, 5~50 µm or 3~30 µm. The smaller height difference H will decrease the size of the air gap 114, so light can't be effectively diffused and light diffusion (haze) of the diffusing sheet 102 drops. The greater height difference H will increase the thickness of the entire optical assembly 100 and thus the size of the entire optical assembly 100 can't be shrunken. Compared to the conventional point-bonding, the present invention can largely increase the adhesive force between the first optical film 101 and the diffusing sheet 102 and control the size of the air gap 114 between the space 113 of the first surface 102A of the diffusing sheet 102 and the adhesive layer 103 to improve light diffusion at the same time.

The adhesive layer 103 can be made of a unitary/homogeneous material. Optionally, the unitary/homogeneous material can include light-diffusing particles or can't include light-diffusing particles. The thinner adhesive layer 103 (e.g., the thickness of the adhesive layer 103 can be smaller than 2.5 µm, smaller than 2 µm, smaller than 1.5 µm or smaller than 1 µm) can also reduce adsorption phenomenon on both two sides of the second microstructure 112 resulting from capillarity phenomenon to improve light diffusion of the first surface 102A of the diffusing sheet 102 and the brightness of the entire optical assembly 100. The second surface 103B of the adhesive layer 103 can be a structured surface according to U.S. provisional application Ser. No. 62/372,315, which had been incorporated by reference therein.

Figure 3:
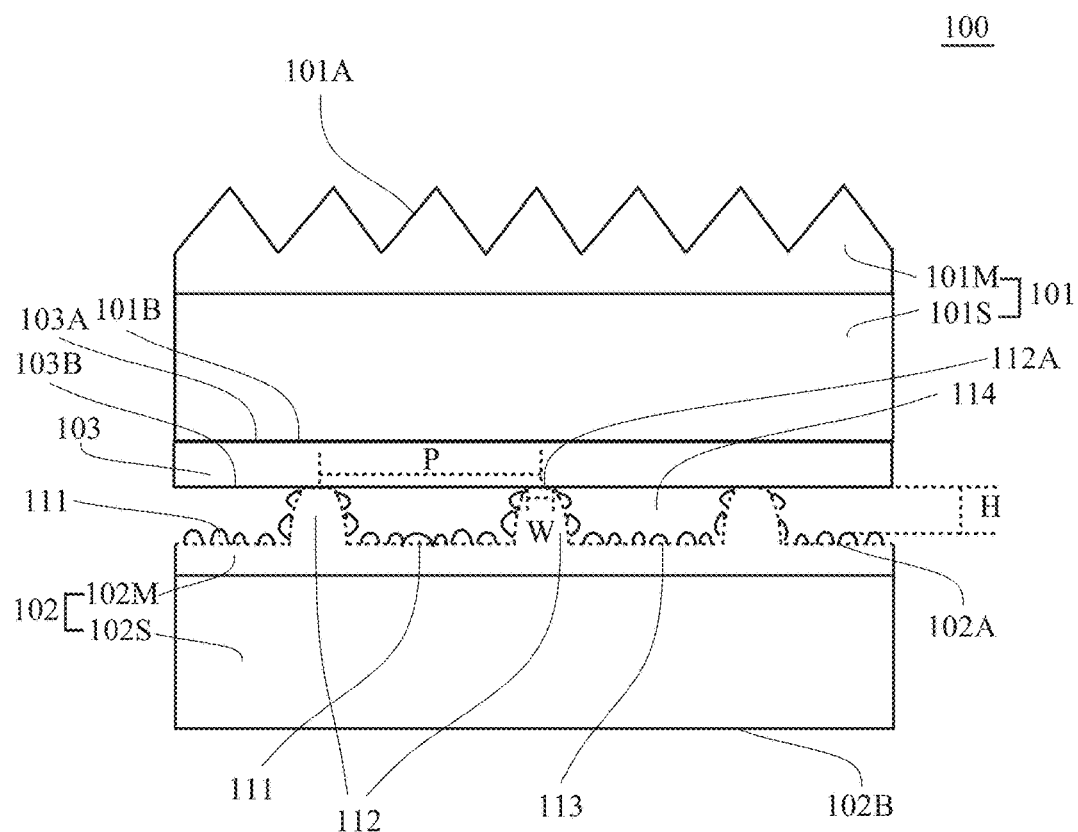
FIG. 3 illustrates that a schematic cross-sectional view of the optical assembly used in the backlight module in another embodiment of the present invention, wherein the top surface of the second microstructure is a planar surface (i.e. the top has a small platform)
Figure 4:
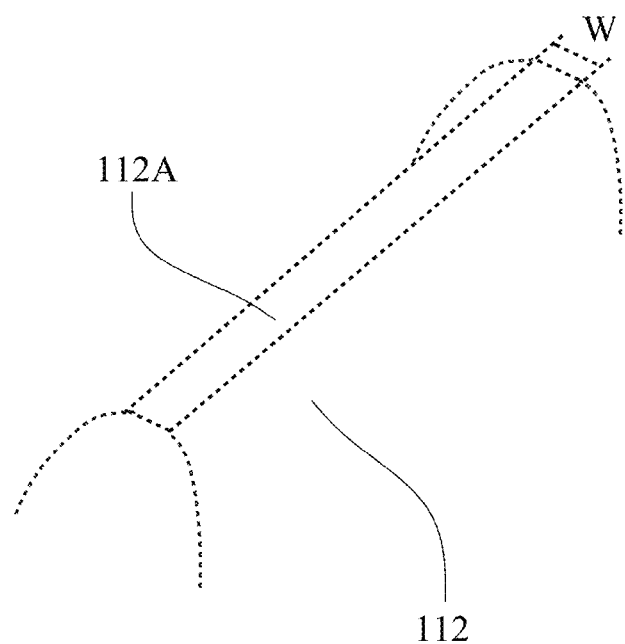
FIG. 4 illustrates that the single second microstructure has a top planar surface (the first microstructures on the single second microstructure are omitted)

FIG. 3 illustrates that a schematic cross-sectional view of the optical assembly 100 used in the backlight module in another embodiment of the present invention, wherein the top surface 112A of the second microstructure 112 is a planar surface (i.e. the top has a small platform 112A). FIG. 4 illustrates that the single second microstructure 112 has a top planar surface 112A (the first microstructures 111 on the single second microstructure 112 are omitted). Optionally, the top planar surface 112A of the second microstructure 112 may/may not penetrate into the adhesive layer 103. The top planar surface 112A of the second microstructure 112 can increase area bonding to the adhesive layer 103 to increase the adhesive force between the first optical film 101 and the diffusing sheet 102. There can be enough adhesive force between the first optical film 101 and the diffusing sheet 102 by contacting the top planar surface 112A of the second microstructure 112 with the adhesive layer 103 so as to reduce adsorption phenomenon on both two sides of the second microstructure 112 resulting from capillarity phenomenon to improve light diffusion of the first surface 102A of the diffusing sheet 102 and brightness of the entire optical assembly 100. The width W of the top planar surface 112A of the second microstructure 112 is at least 1 µm. The distance P between the adjacent tops of the second microstructures 112 is at least 100 µm. In one embodiment, the width W can be 1~10 µm, 1~5 µm or 1~3 µm. The smaller width W will decrease area bonding to adhesive layer 103 to reduce the adhesive force between the first optical film 101 and the diffusing sheet 102. The greater width W will increase area bonding to adhesive layer 103 to reduce light diffusion (haze) of the diffusing sheet 102. In another embodiment, 0<W/P<0.2. The smaller W/P will decrease area bonding to adhesive layer 103 to reduce the adhesive force between the first optical film 101 and the diffusing sheet 102. The greater W/P will increase area bonding to adhesive layer 103 to reduce light diffusion (haze) of the diffusing sheet 102. The distance P can be 100~1000 µm or 100~500 µm. The smaller distance P will increase area bonding to adhesive layer 103 to reduce light diffusion (haze) of the diffusing sheet 102. The greater distance P will lead to that the density of the second microstructures 112 is too low to effectively support the first optical film 101 and increase the rigidity of the entire optical assembly 100.

Figure 5:
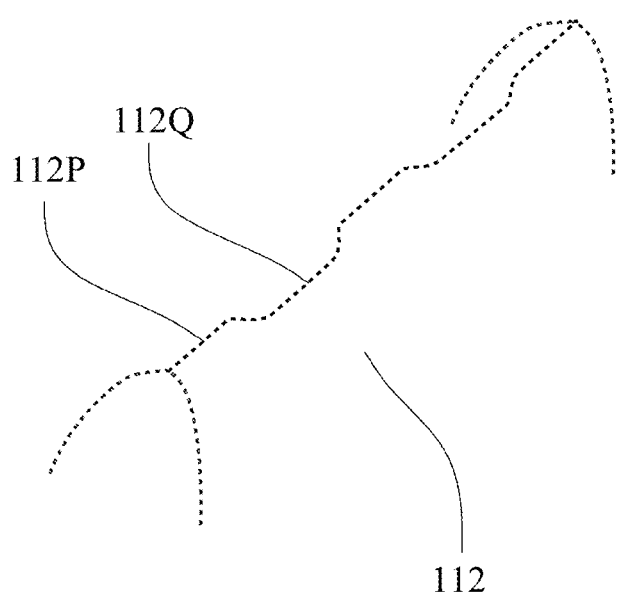
FIG. 5 illustrates that the height of the top of the second microstructure can vary along the length direction of the second microstructure.
Figure 6:
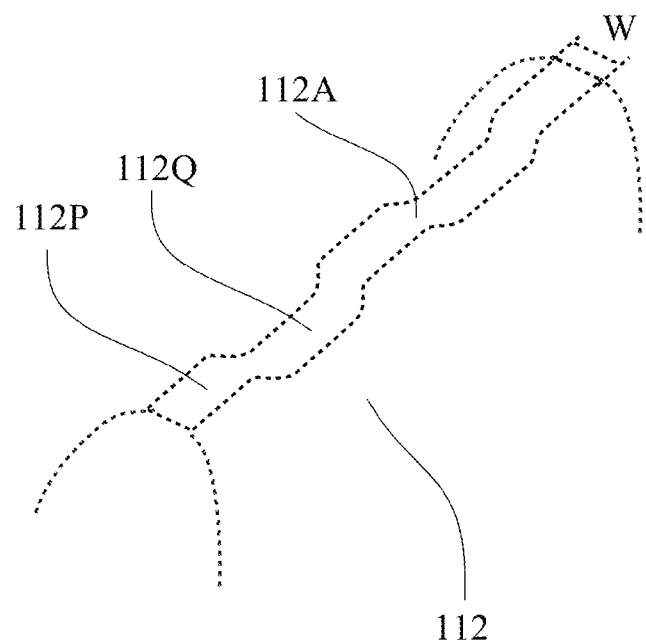
FIG. 6 illustrates that the height of the top planar surface of the second microstructure can vary along the length direction of the second microstructure.

In one embodiment, the height of the top or the top planar surface 112A of the second microstructure 112 can vary along the length direction of the second microstructure 112 (see FIG. 5 and FIG. 6). The top or the top planar surface 112A of the second microstructure 112 can be also changed to comprise a plurality of elevating portions 112P (may have a constant height) and a plurality of non-elevating portions 112Q (may have a constant height) alternating with the plurality of elevating portions 112P, and the elevating portions 112P of the top or the top planar surface 112A of the second microstructure 112 is boned to the second surface 103B of the adhesive layer 103. The air gaps 114 can exist between the non-elevating portions 112Q of the top or the top planar surface 112A of the second microstructure 112 and the adhesive layer 103 to improve light diffusion.

The photo-curable material (e.g., UV-Type resin) or the thermally-curable material can be used to form the first surface 102A of the diffusing sheet 102. The first curing reaction proceeds in the photo-curable material or the thermally-curable material of the first surface 102A of the diffusing sheet 102 such that the photo-curable material or the thermally-curable material of the first surface 102A of the diffusing sheet 102 is in the semi-cured state. Subsequently, when adhering the photo-curable material or the thermally-curable material of the first surface 102A of the diffusing sheet 102 to the adhesive layer 103 on the second surface 101B of the first optical film 101, the second curing reaction proceeds so that the photo-curable material or the thermally-curable material of the first surface 102A of the diffusing sheet 102 and the adhesive layer 103 on the second surface 101B of the first optical film 101 is in the fully cured state (hardened) to increase the adhesive force therebetween. The first curing reaction and the second curing reaction can be both used to increase the adhesive force.

The chemical formula of the photo-curable material of the first surface 102A of the diffusing sheet 102 can be R1-F1. The main chain R1 can be a long carbon chain, an aromatic compound, a benzene-ring compound or a soft Polyurethane (PU) compound, and so on. The reactive functional-group F1 can comprise one acrylate functional group, two acrylate functional groups, three acrylate functional groups or more acrylate functional groups, and so on. The chemical formula of thermally-curable material of the first surface 102A of the diffusing sheet 102 can be R2-F2. The main chain R2 can be a long carbon chain, an aromatic compound, a benzene-ring compound or a soft Polyurethane PU compound, and so on. The reactive functional-group F2 can be an epoxy functional group or a hydroxyl functional group.

The first microstructures 111 and the second microstructures 112 of the first surface 102A of the diffusing sheet 102 can be formed by film-embossing of the mold/roll. The making of the mold/roll is described as below:

(a) A plurality of trenches respectively corresponding to the second microstructures 112 are first cut on the surface of the mold/roll by a hard tool. The hard tool may be a tool of small size mounted on a CNC (Computer Numeric Control) machine (e.g., turning, milling and ruling/shaping machines); and (b) The treatment process such as sand-blasting process proceeds on the surface of the above mold/roll which has a plurality of trenches thereon so as to form the surface of the mold/roll corresponding to the first microstructures 111 and the second microstructures 112.

Experiments

In Embodiment 1 of the present invention, the second microstructures 112 of the first surface 102A of the diffusing sheet 102 are bonded to the second surface 103B of the adhesive layer 103. In conventional Comparative Embodiment 1, only the irregular elevating portions of the structured surface of the diffusing sheet are respectively point-bonded to the adhesive layer on the backside of the optical film. The adhesive layer 103 in Embodiment 1 and Comparative Embodiment 1 is made of a combination of Dipentaerythritol Hexaacrylate (DPHA CNS, manufactured by Sartomer Company), Bisphenol A (EO)30 Dimethacrylate (M2301, manufactured by Miwon Company) and Isodecyl Acrylate (M130, manufactured by Miwon Company). Dipentaerythritol Hexaacrylate is 40% the material of the adhesive layer 103 in weight. Bisphenol A (EO)30 Dimethacrylate is 10% the material of the adhesive layer 103 in weight. Isodecyl Acrylate is 50% the material of the adhesive layer 103 in weight. The light diffusing layer of the diffusing sheet in Embodiment 1 and Comparative Embodiment 1 is made of a combination of Difunctional Epoxy Acrylate (RV-280, manufactured by Aekyung Chemical Company), Bisphenol A (EO)10 Dimethacrylate (M2101, manufactured by Miwon Company) and Tetrahydrofurfuryl Acrylate (M150, manufactured by Miwon Company). Difunctional Epoxy Acrylate is 40% the material of the light diffusing layer in weight. Bisphenol A (EO)10 Dimethacrylate is 50% the material of the light diffusing layer in weight. Tetrahydrofurfuryl Acrylate is 10% the material of the light diffusing layer in weight. Moreover, Photoinitiator 184 is added in each embodiment. After four hours of stirring at normal temperature, proceed to coating, preparing and manufacturing of sample and physical measurement. The measurement result is listed in Table 1.

TABLE 1

| | Embodiment 1 | Comparative Embodiment 1 |
|---|---|---|
| the width of the top planar surface (μm) | 1~3 | none |
| the thickness of the adhesive layer (μm) | 1.5~2.0 | 1.5~2.0 |
| the haze of the diffusing sheet before adhesion | 86.2% | 82.3% |
| the haze of the diffusing sheet after adhesion | 84.9% | 70.1% |
| brightness (optical gain) | 1.48 | 1.50 |
| adhesive force (g/25 mm) | 86 | 38 |
| flaw-masking | fine | bad |

Embodiment 1

Use the adhesive photo-curable material (e.g., UV-Type resin) as the material of the light diffusing layer 102M of the diffusing sheet 102. The first curing reaction proceeds in the light diffusing layer 102M embossed by the roll such that the light diffusing layer 102M has the second microstructures 112 with the top planar surface 112A having a width of 1~3 μm. Use the photo-curable material (e.g., UV-Type resin) as the material of the adhesive layer 103 and coat the second surface 101B of the PET substrate 101S of the prism sheet 101 with the material of the adhesive layer 103. Then, the top planar surface 112A of the second microstructure 112 of the light diffusing layer 102M is bonded to the adhesive layer 103 on the second surface 101B of the PET substrate 101S of the prism sheet 101 by roll-embossing (After drying the solvent in the adhesive layer 103, control the thickness the dry film of the adhesive layer 103 to be 1.5~2.0 μm to have adhesive effect between the top planar surface 112A of the second microstructure 112 of the light diffusing layer 102M of the diffusing sheet 102 and the second surface 101B of the PET substrate 101S of the prism sheet 101. The second curing reaction proceeds in the material of the light diffusing layer 102M again to have indirect chemical adhesion between the top planar surface 112A of the second microstructure 112 of the light diffusing layer 102M of the diffusing sheet 102 and the second surface 101B of the PET substrate 101S of the prism sheet 101.). The adhesive force between the top planar surface 112A of the second microstructure 112 of the light diffusing layer 102M of the diffusing sheet 102 and the second surface 101B of the PET substrate 101S of the prism sheet 101 can be 86 g/25 mm. Because the top planar surface 112A of the second microstructure 112 of the light diffusing layer 102M only contacts the adhesive layer 103 and doesn't penetrate into the adhesive layer 103, adsorption phenomenon on both two sides of the second microstructure 112 resulting from capillarity phenomenon can be reduced to improve light diffusion of the structured surface 102A of the diffusing sheet 102 and brightness of the whole optical assembly 100.

Comparative Embodiment 1

Use the adhesive photo-curable material (e.g., UV-Type resin) as the material of the adhesive layer and coat the backside of the PET substrate of the prism sheet with the material of the adhesive layer. The curing reaction proceeds in the irregular/random elevating/protruding portions of the light diffusing layer of the diffusing sheet and the material of the adhesive layer to have adhesive effect (point-bonding). Because the elevating/protruding portions of the light diffusing layer are irregularly/randomly distributed and the elevating/protruding portions of the light diffusing layer only contacts the adhesive layer and doesn't penetrate into the adhesive layer, the adhesive force (only 38 g/25 mm) in Comparative Embodiment 1 is lower than the adhesive force in Embodiment 1. The haze after adhesion is also less than the haze before adhesion by 12.2% and thus the degree of the flaw-masking decreases.

According to the experiment result, the adhesive force in Embodiment 1 of the present invention is obviously superior than that in Comparative Embodiment 1, the difference between the haze before adhesion and the haze after adhesion in Embodiment 1 of the present invention is less than that in Comparative Embodiment 1 and flaw-masking in Embodiment 1 of the present invention is better than that in Comparative Embodiment 1 so as to solve the problems including poor light uniformity, poor flaw-masking, poor adhesive force, poor adhesive uniformity, and so on in the adhesive process.

The above disclosure is related to the detailed technical contents and inventive features thereof. People skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An optical assembly used in the backlight module, comprising:

a first optical film having a first surface;

an adhesive layer having a second surface and a third surface opposite to the second surface, wherein the second surface of the adhesive layer is disposed on the first surface of the first optical film; and a diffusing sheet having a fourth surface comprising a plurality of first microstructures and a plurality of second microstructures, wherein each of the plurality of second microstructures extends along a first direction, wherein the maximum height of the plurality of second microstructures is greater than that of the plurality of first microstructures so as to bond the plurality of second microstructures to the third surface of the adhesive layer.

2. The optical assembly according to claim 1, wherein the average height of the plurality of second microstructures is greater than that of the plurality of first microstructures by 3~50 µm.

3. The optical assembly according to claim 1, wherein the fourth surface has a first edge and a second edge opposite to the first edge, wherein each of the plurality of second microstructures extends from the first edge of the fourth surface to the second edge of the fourth surface.

4. The optical assembly according to claim 3, wherein each of the plurality of first microstructures doesn't extend from the first edge of the fourth surface to the second edge of the fourth surface and the average size of the plurality of first microstructures is smaller than the average size of the plurality of second microstructures.

5. An optical assembly used in the backlight module, comprising:
a first optical film having a first surface;
an adhesive layer having a second surface and a third surface opposite to the second surface, wherein the second surface of the adhesive layer is disposed on the first surface of the first optical film; and
a diffusing sheet having a fourth surface comprising a plurality of first microstructures and a plurality of second microstructures, wherein each of the plurality of second microstructures extends along a first direction, and each two adjacent second microstructures have a space therebetween, wherein each of the plurality of second microstructures has a top and a pair of lateral surfaces each of which extends from the top to the space, wherein a first portion of the plurality of first microstructures are distributed on the pair of lateral surfaces of each of the plurality of second microstructures, and a second portion of the plurality of first microstructures are distributed on the spaces, wherein the maximum height of the plurality of second microstructures is greater than that of the second portion of the plurality of first microstructures on the spaces so as to bond the plurality of second microstructures to the third surface of the adhesive layer.

6. The optical assembly according to claim 5, wherein the average height of the plurality of second microstructures is greater than that of the second portion of the plurality of first microstructures on the spaces by 3~50 µm.

7. The optical assembly according to claim 5, wherein the fourth surface has a first edge and a second edge opposite to the first edge, wherein each of the plurality of second microstructures extends from the first edge of the fourth surface to the second edge of the fourth surface.

8. The optical assembly according to claim 7, wherein each of the plurality of first microstructures doesn't extend from the first edge of the fourth surface to the second edge of the fourth surface and the average size of the plurality of first microstructures is smaller than the average size of the plurality of second microstructures.

9. The optical assembly according to claim 5, wherein the adhesive force between the plurality of second microstructures of the diffusing sheet and the third surface of the adhesive layer is at least 50 g/25 mm.

10. The optical assembly according to claim 5, wherein each of the plurality of first microstructures is a diffusing microstructure and each of the plurality of second microstructures is a bonding microstructure.

11. The optical assembly according to claim 5, wherein each of the plurality of second microstructures has a top planar surface bonded to the third surface of the adhesive layer.

12. The optical assembly according to claim 11, wherein the top planar surface of each of the plurality of second microstructures has a width of 1~10 µm.

13. The optical assembly according to claim 11, wherein the top planar surface of each of the plurality of second microstructures has a width W and each two adjacent second microstructures has a distance P therebetween, wherein 0<W/P<0.2.

14. The optical assembly according to claim 11, wherein the top planar surface of each of the plurality of second microstructures has a width W and each two adjacent second microstructures has a distance P therebetween, wherein W is at least 1 µm and P is at least 100 µm.

15. The optical assembly according to claim 5, wherein the first portion of the plurality of first microstructures are completely distributed on the pair of lateral surfaces of each of the plurality of second microstructures.

16. An optical assembly used in the backlight module, comprising:
a first optical film having a first surface;
an adhesive layer having a second surface and a third surface opposite to the second surface, wherein the second surface of the adhesive layer is disposed on the first surface of the first optical film; and
a diffusing sheet having a fourth surface comprising a plurality of first microstructures and a plurality of second microstructures, wherein each of the plurality of second microstructures extends along a first direction, and each two adjacent second microstructures have a space therebetween, wherein the bottom width of the plurality of second microstructures is smaller than the width of the spaces, wherein the maximum height of the plurality of second microstructures is greater than that of at least one portion of the plurality of first microstructures on the spaces so as to bond the plurality of second microstructures to the third surface of the adhesive layer.

17. The optical assembly according to claim 16, wherein the fourth surface has a first edge and a second edge opposite to the first edge, wherein each of the plurality of second microstructures extends from the first edge of the fourth surface to the second edge of the fourth surface.

18. The optical assembly according to claim 17, wherein each of the plurality of first microstructures doesn't extend from the first edge of the fourth surface to the second edge of the fourth surface and the average size of the plurality of first microstructures is smaller than the average size of the plurality of second microstructures.

19. The optical assembly according to claim 16, wherein each of the plurality of second microstructures has a top planar surface bonded to the third surface of the adhesive layer.

20. The optical assembly according to claim 19, wherein the top planar surface of each of the plurality of second microstructures has a width of 1~10 μm.

21. The optical assembly according to claim 19, wherein the top planar surface of each of the plurality of second microstructures has a width W and each two adjacent second microstructures has a distance P therebetween, wherein $0<W/P<0.2$.

22. The optical assembly according to claim 19, wherein the top planar surface of each of the plurality of second microstructures has a width W and each two adjacent second microstructures has a distance P therebetween, wherein W is at least 1 μm and P is at least 100 μm.

23. The optical assembly according to claim 16, wherein the adhesive force between the plurality of second microstructures of the diffusing sheet and the third surface of the adhesive layer is at least 50 g/25 mm.

24. The optical assembly according to claim 16, wherein each of the plurality of first microstructures is a diffusing microstructure and each of the plurality of second microstructures is a bonding microstructure.

* * * * *